United States Patent
Yoshida

(10) Patent No.: US 6,215,571 B1
(45) Date of Patent: Apr. 10, 2001

(54) FEED-FORWARD TYPE DISTORTION COMPENSATING SYSTEM WITH LESS DISTORTION QUANTITY

(75) Inventor: Toshiro Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/954,610

(22) Filed: Oct. 20, 1997

(30) Foreign Application Priority Data

Nov. 8, 1996 (JP) .................................................. 8-296350

(51) Int. Cl.[7] .................................................. H04B 10/00
(52) U.S. Cl. ............................ 359/161; 359/180; 359/187
(58) Field of Search .................................. 359/180, 187, 359/161

(56) References Cited

U.S. PATENT DOCUMENTS

| | | | | |
|---|---|---|---|---|
| 5,214,524 | * | 5/1993 | Shigematsu et al. | 359/124 |
| 5,691,759 | * | 11/1997 | Hanson | 347/233 |

FOREIGN PATENT DOCUMENTS

| | | | | |
|---|---|---|---|---|
| 2524229 | * | 9/1983 | (FR) | 359/187 |
| 1-204235 | | 8/1989 | (JP) . | |
| 2-134732 | | 5/1990 | (JP) . | |
| 2-143732 | | 6/1990 | (JP) . | |
| 2-143733 | | 6/1990 | (JP) . | |
| 3-104331 | | 5/1991 | (JP) . | |
| 7-245599 | | 9/1995 | (JP) . | |
| 07245599 | * | 9/1995 | (JP) | 359/124 |
| 9-312611 | | 12/1997 | (JP) . | |

OTHER PUBLICATIONS

Japanese Office Action, dated May 23, 2000, with English language translation of Japanese Examiner's comments.
Japanese Office Action, dated Feb. 8, 2000, with English language translation of Japanese Examiner's comments.

* cited by examiner

Primary Examiner—Leslie Pascal
Assistant Examiner—Hanh Phan
(74) Attorney, Agent, or Firm—McGuireWoods LLP

(57) ABSTRACT

In a feed-forward distortion compensating system, first and second laser diodes are provided on a same semiconductor chip to modulate first and second electric signals in light intensity to produce first and second light signals, respectively. A photoelectric conversion unit converts a part of the first light signal into a third electric signal. A distortion compensating signal generator synthesizes the third electric signal and a fourth electric signal associated with the first electric signal into the second electric signal. The second electric signal is light-intensity-modulated into the second light signal. A light signal synthesizing unit synthesizes the first light signal and the second light signal into a transmission light signal.

10 Claims, 2 Drawing Sheets

FEED-FORWARD TYPE DISTORTION COMPENSATING SYSTEM WITH LESS DISTORTION QUANTITY

BACKGROUND OF THE INVENTION

1. Field of the Invention

The present invention relates to a feed-forward distortion compensating system in optical communication, and more particularly, to a feed-forward distortion compensating system which can restrain modulation distortion of a light output by feed-forward control, in a light transmission unit which is used for analog light transmission such as light SCM transmission in CATV and so on.

2. Description of the Related Art

FIG. 1 is a block diagram illustrating the structure of a light transmission unit to which a conventional feed-forward distortion compensating system is applied. Referring to FIG. 1, the conventional feed-forward distortion compensating system is composed of a signal generator 1, a first laser diode 2, a splitter 3, a photoelectric converter 4 of a PIN diode and so on, an inversion type amplifier 5, a distortion signal detector 6, a second laser diode 7, a synthesizing unit 8, a first delay section 9, and a second delay section 10. In this case, thick lines indicate optical fibers and thin lines indicate coaxial cables.

The signal generator 1 outputs an analog electric carrier signal a in which a plurality of electric signals have been multiplexed in frequency. The analog carrier signal a is branched into a carrier signal a' and a carrier signal a". One of the branched carrier signals, a', is supplied to the first laser diode 2. The first laser diode 2 modulates the branched carrier signal a' from the signal generator 1 in light intensity to emit a main light signal b. As a result, the main light signal b contains modulation distortion together with the carrier signal. The main light signal b which has been outputted from the first laser diode 2 is branched into two parts, i.e., light signals c and d by the splitter 3.

The light signal c from the splitter 3 is supplied to the photoelectric converter 4. The photoelectric converter 4 converts the light signal c into an electric signal e. The electric signal e is supplied to the distortion signal detector 6 as an electric signal f after being amplified by the inversion type amplifier 5. The branched carrier signal a" is supplied to the distortion signal detector 6 after being delayed by a predetermined time period by the delay line 9 to match to the electric signal f in synthesization timing. The distortion signal detector 6 synthesizes the electric signal f from the inversion type amplifier 5 and the delayed carrier signal a".

At this time, because the phase of the electric signal f from the inversion type amplifier 5 and the phase of the delayed carrier signal a" are opposite to each other, the carrier components of these signals are canceled. Therefore, the electric signal g which is outputted from the distortion signal detector 6 contains only a distortion component which has been generated in the first laser diode 2.

The distortion component g which has been detected by the distortion signal detector 6 is supplied to the second laser diode 7. The second laser diode 7 modulates the distortion signal g from the distortion signal detector 6 in light intensity and generates an auxiliary light signal h.

The auxiliary light signal h from the second laser diode 7 is supplied to the synthesizing unit 8. The synthesizing unit 8 synthesizes the main light signal d from the first laser diode 2, i.e., the other of the light signals branched by the splitter 3 and the auxiliary light signal h from the second laser diode 7. In this case, the main light signal d is supplied to the synthesizing unit 8 after being delayed by a predetermined time period by the delay line 10 to match to the auxiliary light signal h in synthesization timing.

At this time, the phase of the main light signal generated in the first laser diode 2 and delayed by the delay line 10 is opposite to the phase of the auxiliary light signal h generated by the second laser diode 7. Therefore, a distortion component is substantially removed in the signal i which is output from the synthesizing unit 8 such that the signal is a low distortion signal.

Such a feed-forward distortion compensating system is disclosed in Japanese Laid Open Patent Disclosure (JP-A-Heisei 2-143732).

However, in the above-mentioned conventional feed-forward distortion compensating system, the amplitude characteristic and phase characteristic of the distortion signal generated in the second laser diode 7 is not always coincident with those of the distortion signal generated in the first laser diode 2. Therefore, it is difficult to achieve a large distortion improving quantity.

SUMMARY OF THE INVENTION

The present invention is made in the view of the above circumstances. Therefore, an object of the present invention is to provide a feed-forward type distortion compensating system which can solve the above-mentioned problems.

Another object of the present invention is to provide a feed-forward type distortion compensating system which can improve signal distortion solve by using a pair of laser diodes.

In order to achieve an aspect of the present invention, a feed-forward distortion compensating system includes first and second laser diodes provided on a same semiconductor chip, for modulating first and second electric signals in light intensity to produce first and second light signals, respectively, a photoelectric conversion unit for converting a part of the first light signal into a third electric signal, a distortion compensating signal generator for synthesizing the third electric signal and a fourth electric signal associated with the first electric signal into the second electric signal, the second electric signal being light-intensity-modulated into the second light signal, and a light signal synthesizing unit for synthesizing the first light signal and the second light signal into a transmission light signal.

In this case, a delay section delays the fourth electric signal such that the delayed fourth electric signal has a phase opposite to that of the third electric signal. As a result, the distortion compensating signal generator includes an adder for adding the delayed fourth electric signal and the third electric signal.

Also, the first light signal is outputted from the first laser diode to the light signal synthesizing unit to have a predetermined delay time such that the first light signal has a phase opposite to that of the second light signal.

In order to achieve another aspect of the present invention, a method of feed-forward compensating a transmission light signal for distortion, includes the steps of:

modulating a first electric signal in light intensity by a first laser diode to produce a main light signal;

converting a part of the main light signal into a second electric signal;

synthesizing the second electric signal and a third electric signal associated with the first electric signal into the fourth electric signal; modulating the fourth electric signal in light intensity by a second laser diode to produce a distortion compensation signal, the first and second laser diodes being formed on a same semiconductor chip; and removing distortion from the main light signal based on the distortion compensation signal to produce a transmission light signal.

DESCRIPTION OF THE PREFERRED EMBODIMENTS

The feed-forward distortion compensating system of the present invention will be described below in detail with reference to the attached drawings.

Figure 1:
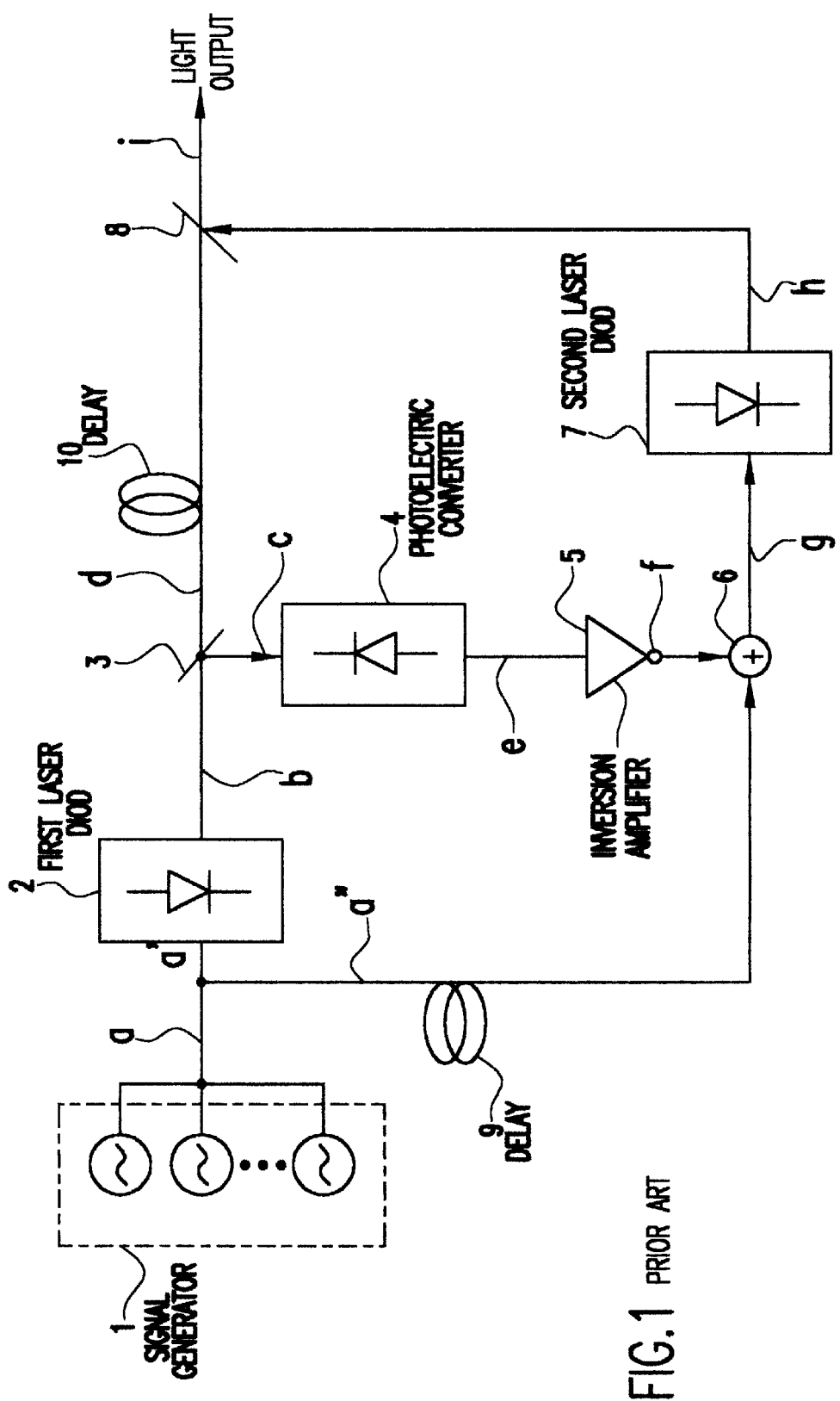
FIG. 1 is a block diagram illustrating the structure of a light transmission unit to which a conventional feed-forward type distortion compensating system is applied.
Figure 2:
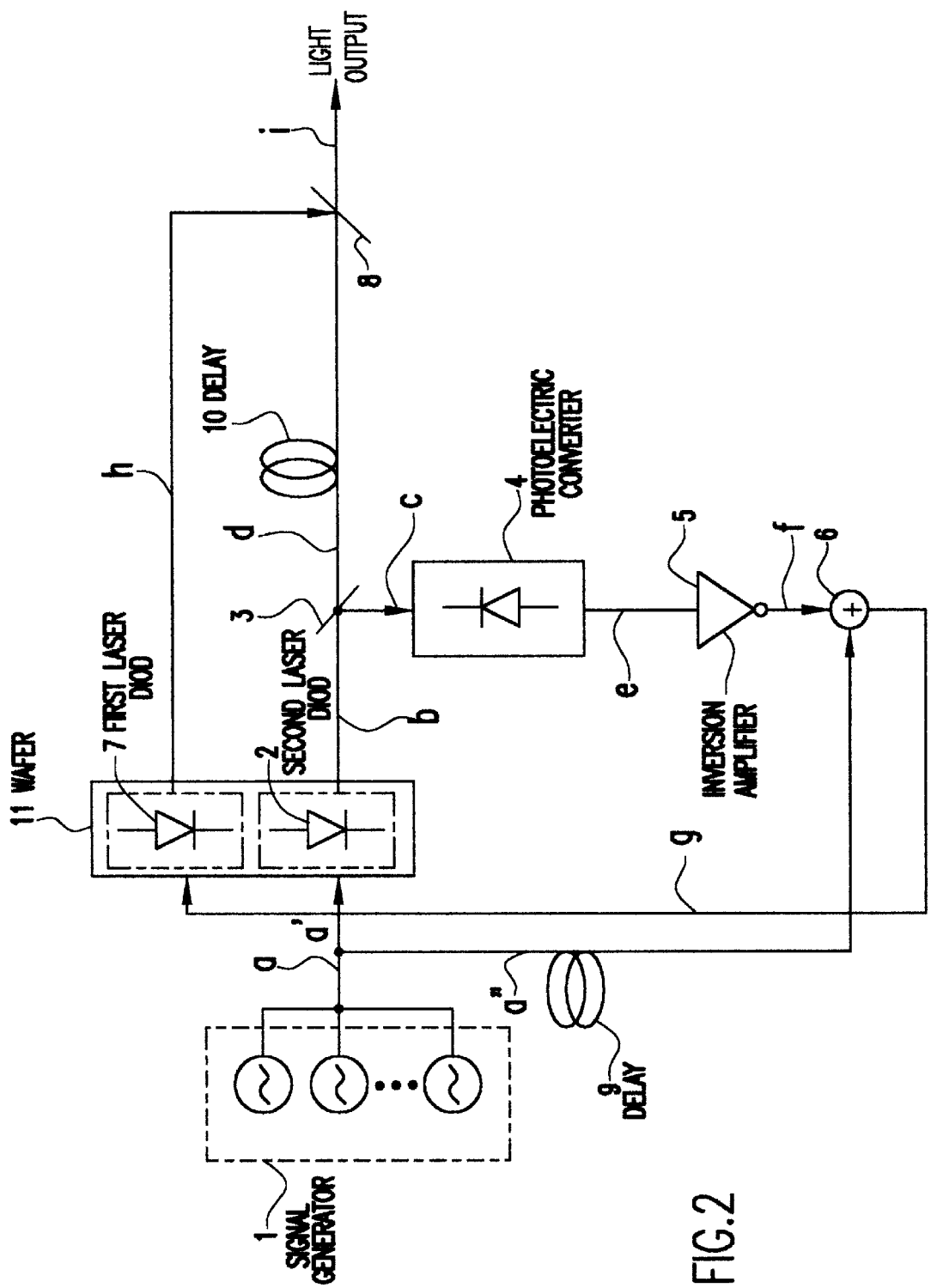
FIG. 2 is a block diagram illustrating the structure of a light transmission unit to which a feed-forward distortion compensating system according to an embodiment of the present invention is applied.

FIG. 2 is a block diagram illustrating the structure of a light transmission unit to which a feed-forward distortion compensating system according to an embodiment of the present invention is applied. Referring to FIG. 2, the feed-forward distortion compensating system is composed of a signal generator 1, a first laser diode 2, a splitter 3, a photoelectric converter 4 of a PIN diode and so on, an inversion type amplifier 5, a distortion signal detector 6, a second laser diode 7, a synthesizing unit 8, a first delay section 9, and a second delay section 10. In this embodiment, the first laser diode 2 and the second laser diode 7 are formed on the same chip to operate a pair of laser diodes. In this case, thick lines indicate optical fibers and thin lines indicate coaxial cables.

The signal generator 1 outputs an analog carrier signal a in which a plurality of electric signal have been multiplexed in frequency. The analog carrier signal a is branched into a carrier signal a' and a carrier signal a". One of the carrier signals, a', is supplied to the first laser diode 2. The first laser diode 2 modulates the branched carrier signal a' from the signal generator 1 in light intensity to emit a main light signal b. As a result, the main light signal b contains modulation distortion together with the carrier signal. The main light signal b which has been output from the first laser diode 2 is branched into two parts, i.e., light signals c and d by the splitter 3.

The light signal c from the splitter 3 is supplied to the photoelectric converter 4. The photoelectric converter 4 converts the light signal c into an electric signal e. The electric signal e is supplied to the distortion signal detector 6 as an electric signal f after being amplified by the inversion type amplifier 5. The branched carrier signal a" is supplied to the distortion signal detector 6 after being delayed by a predetermined time period by the delay line 9 to match to the electric signal f in synthesization timing. The distortion signal detector 6 synthesizes the electric signal f from the inversion type amplifier 5 and the delayed carrier signal a".

At this time, because the phase of the electric signal f from the inversion type amplifier 5 and the phase of the delayed carrier signal a" are opposite to each other, the carrier components of these signals are canceled. Therefore, the electric signal g which is outputted from the distortion signal detector 6 contains only a distortion component which has been generated in the first laser diode 2.

The distortion component g which has been detected by the distortion signal detector 6 is supplied to the second laser diode 7. The second laser diode 7 modulates the distortion signal g from the distortion signal detector 6 in light intensity and generates an auxiliary light signal h.

The auxiliary light signal h from the second laser diode 7 is supplied to the synthesizing unit 8. The synthesizing unit 8 synthesizes the main light signal d from the first laser diode 2, i.e., the other of the light signals branched by the splitter 3 and the auxiliary light signal h from the second laser diode 7. In this case, the main light signal d is supplied to the synthesizing unit 8 after being delayed by a predetermined time period by the delay line 10 to match to the auxiliary light signal h in synthesization timing.

At this time, the phase of the distortion signal generated in the first laser diode 2 is opposite to the phase of the auxiliary light signal h generated by the second laser diode 7. Therefore, a distortion component is substantially removed in the signal i which is outputted from the synthesizing unit 8 such that the signal is a low distortion signal.

<Reduction of distortion with a pair laser 11>

The distortion improvement quantity becomes large as the characteristic of the first laser diode 2 is analogous to that of the second laser diode 7 to a large extent.

Now, supposing that the generation quantity of distortion by the first laser diode 2 is x and the generation quantity of distortion by the second laser diode 7 is y, the remaining distortion quantity z after the distortion compensation is expressed by the following equation (1).

$$Z = (x^2 + y^2 - 2xy \cos \theta) \tag{1}$$

Where θ is a difference from the optimal phase in the (1) equation.

If the frequency characteristic of the distortion of the first laser diode 2 and the frequency characteristic of the distortion of second laser diode 7 is completely coincident with each other, i.e., x=y, and the phase is optimal, i.e., (θ=0), the remaining quantity z of the distortion is "0" so that distortion compensation can be completely accomplished. In actual, however, the frequency characteristic of the distortion of the first laser diode 2 and the frequency characteristic of the distortion of the second laser diode 7 is never completely coincident with each other.

In the present Invention, because the first laser diode 2 and the second laser diode 7 are formed on the same wafer, I.e., because the two laser diodes 2 and 7 formed on the same wafer as a pair laser 11, these laser diode have very similar characteristics. Therefore, very large distortion improvement quantity can be obtained. That is, in this embodiment, because various types of characteristics are coincident between the first laser diode 2 and the second laser diode 7 which are formed on the same wafer, the very large feed-forward distortion compensation effect can be accomplished.

Also, even If the first laser diode 2 and the second laser diode 7 undergo the change in characteristic due to use time, the distortion improvement quantity can be guaranteed. Thus, the feed-forward distortion compensating system having the distortion improvement quantity independent on the use time can be accomplished.

What is claimed is:

1. A feed-forward distortion compensating system for converting an electrical signal to a light signal, comprising:

first and second laser diodes provided on a same semiconductor chip, for modulating first and second electric signals in light intensity to produce first and second light signals, respectively;

a photoelectric conversion unit for converting a part of said first light signal into a third electric signal;

a distortion compensating signal generator for synthesizing said third electric signal and a fourth electric signal associated with said first electric signal into said second electric signal; and a light signal synthesizing unit for synthesizing said first light signal and said second light signal into a transmission light signal.

2. A feed-forward distortion compensating system according to claim 1, further comprising a delay section for delaying said fourth electric signal such that the delayed fourth electric signal has a phase opposite to that of said third electric signal, and wherein said distortion compensating signal generator includes an adder for adding said delayed fourth electric signal and said third electric signal.

3. A feed-forward distortion compensating system according to claim 1, wherein said first light signal is outputted from said first laser diode to said light signal synthesizing unit to have a predetermined delay time such that said first light signal has a phase opposite to that of said second light signal.

4. A method of feed-forward compensating a transmission light signal for distortion in a system for converting an electrical signal into a light signal, comprising the steps of:

modulating a first electric signal in light intensity by a first laser diode to produce a main light signal;

converting a part of said main light signal into a second electric signal;

synthesizing said second electric signal and a third electric signal associated with said first electric signal into said fourth electric signal;

modulating said fourth electric signal in light intensity by a second laser diode to produce a distortion compensation signal, said first and second laser diodes being formed on a same semiconductor chip; and removing distortion from said main light signal based on said distortion compensation signal to produce a transmission light signal.

5. A method according to claim 4, further comprising the step of delaying said third electric signal such that the delayed third electric signal has a phase opposite to that of said second electric signal, and wherein said synthesizing step includes adding said delayed third electric signal and said second electric signal to produce said fourth electric signal.

6. A method according to claim 4, further comprising the step of delaying said main light signal by a predetermined time period such that said main light signal has a phase opposite to that of said distortion compensation signal.

7. A method of distortion compensating a transmission light signal in a system for converting an electrical signal into a light signal, comprising the steps of:

providing a first laser diode and a second laser diode on a same chip;

converting an input electric data signal with said first laser diode into a first optical signal comprising a data component and a distortion component;

splitting said first optical signal and converting a portion of said split optical signal into an electric signal comprising said data component and said distortion component;

subtracting said input electric data signal from said electric signal comprising said data component and said distortion component to produce an electric distortion signal;

converting said electric distortion signal into an optical distortion signal with said second laser diode; and combining said first optical signal comprising said data component and said distortion component with said optical distortion signal to produce an optical output signal substantially comprising only said data component.

8. A method for distortion compensating a transmission light signal as recited in claim 7, further comprising the step of delaying said input electric data signal prior to said subtraction step.

9. A method for distortion compensating a transmission light signal as recited in claim 7, further comprising the step of delaying said first optical signal comprising said data component and said distortion component prior to said step of combining.

10. A method for distortion compensating a transmission light signal as recited in claim 7, wherein said step of subtraction comprises:

inverting said electric signal comprising said data component and said distortion component; and adding said inverted electric signal comprising said data component and said distortion component to said input electric data signal.

* * * * *